Feb. 16, 1926.
H. H. GERDING ET AL
1,573,111
BOTTLE CRATE
Filed Feb. 13, 1925    2 Sheets-Sheet 1
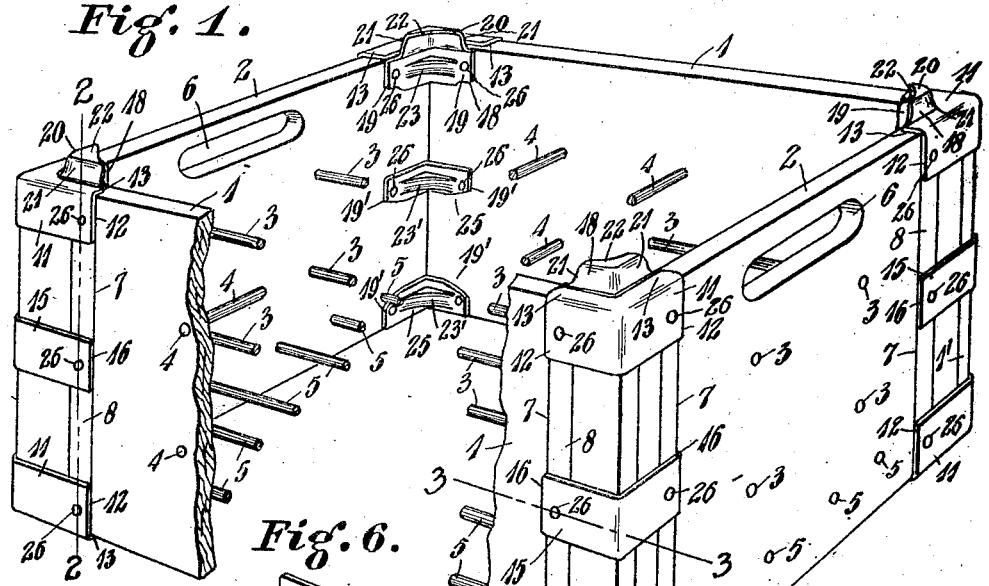
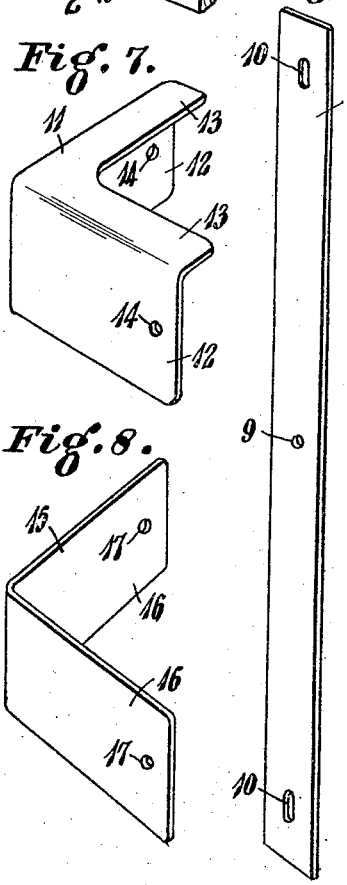
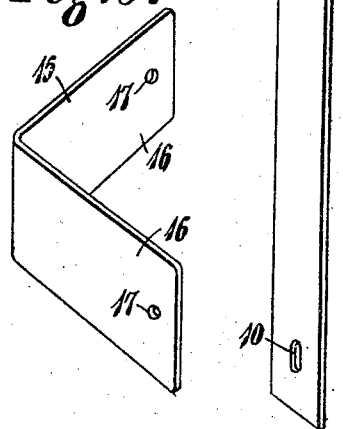
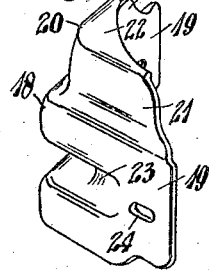
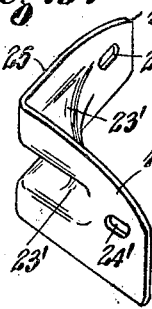
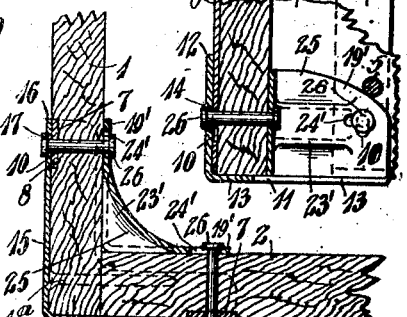
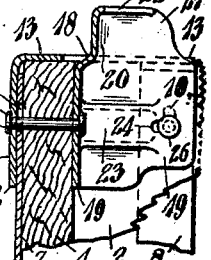
Inventors
Herbert H. Gerding
Edward A. Gerding
By Clarence Pruden
Attorney.

Feb. 16, 1926.
H. H. GERDING ET AL
1,573,111
BOTTLE CRATE
Filed Feb. 13, 1925  2 Sheets-Sheet 2
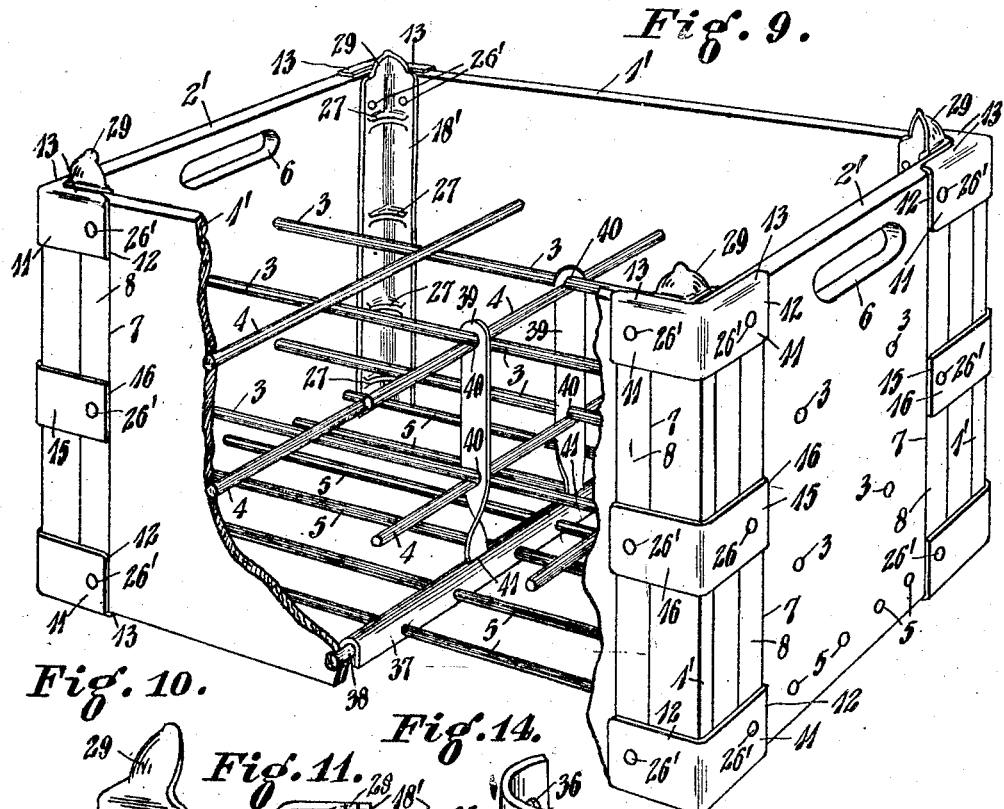

Patented Feb. 16, 1926.

1,573,111

UNITED STATES PATENT OFFICE.

HERBERT H. GERDING, OF NEWPORT, AND EDWARD A. GERDING, OF FORT THOMAS, KENTUCKY.

BOTTLE CRATE.

Application filed February 13, 1925. Serial No. 8,906.

*To all whom it may concern:*

Be it known that we, HERBERT H. GERDING and EDWARD A. GERDING, citizens of the United States, residing, respectively, at Newport and at Fort Thomas, in the county of Campbell and State of Kentucky, have invented certain new and useful Improvements in Bottle Crates, of which the following is a specification.

Our invention relates to reinforced crates or boxes, and more especially to crates for carrying and storing milk bottles. Its object is to simplify and render more effective the reinforcement of such crates, whereby the crates may be manufactured more economically and be more rigid and durable in service. Other objects will appear in the course of the ensuing description.

We attain these objects by the device illustrated, for example, in the accompanying drawings, in which—

Figure 1 is a general perspective view of a milk-bottle crate embodying our invention, part of the near side and parts of the interior partition and bottle supporting rods being broken away better to reveal the interior corner construction;

Fig. 2 is a partial vertical cross-section on the plane of the line 2—2 of Fig. 1;

Fig. 3 is a partial horizontal cross-section on the plane of the line 3—3 of Fig. 1;

Fig. 4 is a detail perspective view of one of the stacking-guide inside corner members;

Fig. 5 is a similar view of one of the intermediate or lower inside corner members;

Fig. 6 is a similar view of one of the upright exterior tie-bars;

Fig. 7 is a similar view of one of the top or bottom exterior corner members;

Fig. 8 is a similar view of one of the intermediate exterior corner members;

Fig. 9 is a general perspective view corresponding to that of Fig. 1, but showing a modification of the interior corner construction;

Fig. 10 is a detail perspective view of one of the modified interior corner members of Fig. 9;

Fig. 11 is a bottom plan view of the same;

Fig. 12 is a detail perspective view of a stacking-guide member similar to that of Fig. 4, but made for use with an inner corner member which is a modification of that of Fig. 10;

Fig. 13 is a partial detail perspective view of such a modified inner corner member as is used with the guide of Fig. 12;

Fig. 14 is a similar view of another modification of the inner corner member;

Fig. 15 is a plan view of the stacking guide therefor;

Fig. 16 is a partial perspective view, looking up at a lower corner of the crate, showing the application of one of the lower outside corner members; and Fig. 17 is a fragmentary perspective view of the reinforcement of the partition and bottle-supporting rods illustrated in Fig. 9.

The crate, as is well known in the art, comprises the two side walls 1 and the two end walls 2 having the ends of the walls 1 lapping across their ends, to which the members 1 may be secured in any suitable manner, as by nailing; a nail 1$^a$ being indicated in Fig. 3. Longitudinal partition rods 3 and transverse partition rods 4 have their ends fixed in the walls 1 and 2, respectively, in any suitable manner, as by spinning or riveting. In like manner, bottle supporting rods 5 run lengthwise of the crate, with their ends fixed in the end walls 2, near the bottom. The end walls 2 have apertures 6 near their upper edges, for insertion of the hands for lifting the crate. All of these details are well known in the art.

In the outer sides of the walls 1 and 2, near the corners of the crate, are relatively wide shallow grooves or gains 7, running from the top to the bottom edge of each wall; and in each groove 7 an upright tie-bar or strip 8 fits snugly, preferably being of relatively thin sheet metal and the groove 7 being of such depth that the exterior of the tie-bar 8 lies substantially flush with the exterior surface of the wall 1 or 2 in which the bar 8 is fitted. These bars 8 run almost to the edges of the walls 1 and 2, as shown; although they may, if desired, run entirely to the edges. About midway of the length of each bar 8 is a circular hole 9, and near respective ends are openings 10 elongated lengthwise of the bar.

Exterior corner members 11 fit on the upper and lower corners of the crate; each comprising upright parts 12 at right angles to each other, to fit against the outer surfaces of the walls 1 and 2, and flanges 13 extending inward from the upper edges of the upright parts 12 and fitting on the edges of the walls 1 and 2. These corner members 11 have their parts 12 and flanges 13 long enough to lap across the adjacent end parts of the tie-bars 8; and each upright part 12 has a circular hole 14 which registers with a respective elongated opening 10 of the overlapped tie-bar 8. Intermediate exterior corner members 15, each comprising simply two upright parts 16 at right angles to each other, fit around respective corners of the exterior of the crate about midway of its height, and each part 16 has a circular hole 17 registering with a respective middle circular hole 9 of the tie-bar 8, which is overlapped by the part 16.

As shown in Figs. 1 to 5, inclusive, there are individual interior corner members opposed to the respective exterior corner members just described. The top ones of these, 18, each comprises two upright parts 19 at right angles to each other, to fit against the inner surfaces of the walls 1 and 2, and an inset upward extension 20 from the upper edges of the parts 19, forming a stacking guide such as is well known in the art; its parts 21 corresponding to the parts 19 joining in a curved corner and being topped by a spandrel shaped part 22 lying inwardly therefrom. About midway of the height of the upright parts 19 the member 18 has its material disposed inwardly forming a hollow spandrel-shaped rib 23 which rigidly braces the two parts 19 relatively to each other diagonally. This rib 23 does not extend entirely to the ends of the member 18; flat parts being left near the ends, in which are respective openings 24 elongated in transverse direction. Each bottom and intermediate interior corner member 25 is like the top interior member 18, except that the stacking-guide extension 20 is omitted; the member simply comprising the upright parts 19' with the diagonal bracing rib 23' and having the elongated openings 24' near the respective ends.

With the exterior and interior corner members assembled against the respective surfaces of the crate corners as described, rivets 26 pass through the crate walls 1 and 2, and through the registering openings of the members. Thus, a rivet passes through the opening 14 of an upper or lower outer corner member, the opening 10 of the tie-bar 8, through the wall 1 or 2, and through the opening 24 of the top inner member 18 or the opening 24' of the bottom inner member; and a rivet passes through the opening 17 of an intermediate outer member, the middle opening 9 of the tie-bar 8, through the wall 1 or 2, and through the opening 24' of an inner intermediate member.

The various members thus being firmly secured against the walls 1 and 2 by the rivets 26, the upright tie-bars 8, by engagement with the edges of the grooves or gains 7 throughout the lengths of the bars 8, enable the outer corner members 11 and 15, fitting tightly around the crate corners, to hold the walls 1 and 2 firmly together at their corner junction; constituting a reinforcement for their attachment by nails or other ordinary fastenings, and practically holding the walls 1 and 2 together independently of the efficiency of these ordinary fastenings. Acting in conjunction with this secure exterior fastening, the inner members, with their diagonal brace ribs 23 and 23', resist lateral collapse or weaving of the wall structure; it being found in actual practice that the four wooden walls 1 and 2, thus connected at their corners, have no perceptible deflection from their required rectangular assemblage under heavy pressure diagonally thereof.

In addition to their laterally resisting function, the tie-bars 8 tie the wooden fibers of each wall 1 or 2 together in upright direction, by virtue of their connections to the upper and lower outer corner members 11; but, owing to the upright elongation of the openings 10 of the bars 8, some up and down spreading of the wall material is permitted. Thus, excessive up and down disruption of the wall material is prevented, yet expansion or swelling of the material in that direction is permitted. This is a very important advantage in crates which are subjected to washing and sterilizing, causing the wooden walls 1 and 2 to swell, especially edgewise. The slidable connection between the wall-edge engaging members 11 and the tie-bars 8, permitted by the elongated openings or slots 10 allows the members 11 to move with the expanding wood, to which they are at all times held by the rivets through the round openings 14. The intermediate members 15, being at a neutral position relative to this expansion, may be fixed to the bars 8; hence the middle openings 9 of the bars 8 need not be elongated.

The inside corner members 18 and 25 all are fixed to the wood with relation to the up and down expansion, and thus are not disturbed by this action; as especially is important with the top members 25, having the stacking guide extensions 20, which should remain firmly fixed and projecting the required distance above the top edges of the walls 1 and 2 under all conditions of use. Being extended an ample distance down from these upper edges, these stacking-guide members have ample leverage below their rivets to resist impacts in handling the crates, which are stacked one above the other, with the stacking guide of the lower crate inside the bottom of the next upper crate. The outer corner members 11, extending their parts or flanges 13 across the wall edges at the bottom, protect the bottom edges of the wooden walls 1 and 2 when the stacking guides of the other crate are entering; and extending across these edges at the top these flanges 13 protect the top wall edges against the bottom flanges of the upper crate. The upright parts of these outer corner members 11, and the intermediate outer corner members 15, protect the upright parts of the crate corners sufficiently; and in some cases the intermediate members 15 may be omitted. The most impacts are at the tops and bottoms; and damage to intermediate upright parts of the wooden corners is not so objectionable as it is at the tops and bottoms. If these intermediate outer members 15 are omitted, the inner intermediate members 25 are omitted; and in some cases the inner intermediate members 25 may be omitted while retaining the outer intermediate members 15, as the rivets of the latter may be depended upon to hold merely against the wood, interiorly, with the strains on the outer intermediate members 15 not so severe as those on the top and bottom members. We find that the diagonal interior bracing of the ribs 23 and 23' of the top and bottom interior members 18 and 25, without that of the intermediate inner members 25, is ample to hold the crate in shape against diagonal impacts. However, when used, they also serve to resist outward warping of the side walls 1 away from the end walls 2; which is not effectively resisted by the outer intermediate members having no diagonal bracing. In this resistance to this warping, the tie-bars 8 also assist, when firmly fixed at their middles, by the rivets, to the inner intermediate members 25. The corner members have ample extension along the walls from the corners to provide ample leverage against diagonal deflection; yet this is provided with a minimum of metal because the metal is not continuous from top to bottom except in the tie-bars 8, which have ample strength in tension lengthwise to resist splitting of the wooden walls 1 and 2, and being firmly reinforced by lying under the outer corner members 11 and 15, can effectively resist warping, flatwise, and can afford effective holding means, edgewise, against endwise displacement of the walls. Also, being relatively far from the ends of the wall pieces 1 and 2, ample cross-section of wood is left between the grooves 7 containing these bars 8, and the ends of the wooden pieces, to resist the shearing strain thus imposed.

Being in several pieces, the corner reinforcements can be varied by omitting one or more of the members, as has just been alluded to, accordingly as a more expensive, stronger crate is desired, or a less expensive crate, strong enough for certain uses, is desired. Moreover, notwithstanding that the almost standard proportions of crates call for the side walls 1 being thinner than the end walls 2, we avoid making unsymmetrical corner members, or right hand and left hand members, by providing the openings 24 and 24' of the inner corner members elongated lengthwise, so that, as seen in Fig. 3, although the rivet in the thin side wall 1 is nearer to the inside corner of the crate than is the rivet in the thick end wall 2, incident to the symmetrical location of these rivets in the outer corner member 15, it is accommodated in the inner end of the elongated opening 24' while the other rivet occupies the outer end of its opening 24'. Thus, we provide for all corners of a crate of this kind with only five different kinds of parts, illustrated in Figs. 4 to 8, inclusive; and where intermediate members are omitted, only four kinds of parts are required. This of course effects a saving in manufacturing equipment, as well as in the quantity of completed parts required to be carried in stock.

As shown in Figs. 9, 10 and 11, each inside corner of the crate has a single corner member 18' having, as shown, four diagonal ribs 27 similar to the ribs 23 and 23' in the first example, spaced at equal intervals, the top and bottom ribs being near the top and bottom edges, respectively, of the crate walls 1' and 2'. Through holes 28 and 28' in these inside corner members, rivets 26' connect with the outside corner construction, which, as here shown, is the same kind as that of the first example, with the upright tie bars 8 and corner members 11 and 15. The holes 28 in the inside members may be large enough to allow some expansion of the walls 1' and 2' up and down, and to provide for the difference in thickness of the walls 1' and 2' horizontally, similarly to the use of the slots 24 of the first example. The tops of these members 18' have formed on them the stacking guides 29 similar to the guides 20 of the first example.

In the modification of Figs. 12 and 13 the guide member 30 is formed separately from the inner corner member 18'', which has ears 31 at its upper corners, inset to lap up inside the guide member 30, with holes 32 registering with holes 33 in the guide member, through which holes rivets may pass through the walls of the crate to attach to the outside corner members as in the previous examples. The holes 32 in the ears 31, elongated up and down, allow for expansion of the walls, while the holes 33 in the guide member 30 receive the rivets snugly so that the guide member 30 moves up and down with the expanding and contracting wall material, keeping the guide member 30 properly projected above the walls.

In the modification of Figs. 14 and 15 the inside corner member 34 and its stacking guide 29', instead of being L-shaped in cross-section as are the members 18', 18" and 30, or 18 and 25, are of approximately quarter-circular cross-section, with their brace ribs 35 and 35' embossed out from this cross-section into angular shape, to fit snugly in the crate corner, with the member 34 inset to receive the guide 29', while the edge parts of the members are riveted to the walls through holes 36 and 36' in connection with outside corner members, as before. The curved continuous interior surface of the member 34 makes a smooth guide for bottles inserted next to the corners, in the crate. This formation may be employed in the individual inside corner members 18 and 25 of the first example, each member having one rib.

In any of the examples it is preferable to have the stacking guide member separate from the other members, as in the first example or that of Figs. 12 and 13, not only as it allows expansion of the walls to be provided for without dislocating the stacking guide relatively to the walls, but because these stacking guides are subjected to more severe usage than any of the other corner parts, and if bent out of shape can thus be renewed conveniently.

The partition and support rods are only partially shown in Fig. 1, and it will be understood that these may have any suitable reinforcement at the middle. In Figs. 9 and 17 we illustrate a suitable reinforcement made up of the inverted channel 37 straddling a transverse rod 38 and abutting its ends against the insides of the side walls 1'; the rod being headed, as by riveting or spinning, outside the wall, thus clamping the channel firmly between the walls 1'. The three pairs of bottle support rods 5 run under this rod 38, through the sides of the channel, which thus clamps the rods 5 to the rod 38. Tie-bars 39, relatively thin and wide, have openings 40 in which they embrace the longitudinal partition rods 3 and the middle transverse partition rods 4; the cross-sections of these tie-bars 39 lying diagonally of the crate. Below the lower rods 3 and 4 these tie-bars 39 are twisted to extend down through lengthwise slots 41 in the channel 37, inside of which channel the lower end parts of these tie-bars are looped around the rod 38; the sides of the channel 37 being spread out at 42 around the loops of the bars 39 and hugging these loops closely, so that the entire middle structure of rods is clamped firmly together, without rivets or other special fastening elements. The rigid corner connections contribute to the maintenance of the partition and support rods firmly in correct position, and relieve these rods of the loosening strains imposed upon said rods in prior constructions not firmly braced diagonally.

The various corner members and tie bars preferably are cut and pressed into shape from sheet metal, but it will be understood that some of them, especially the inner corner members, or the upper and lower outer corner members, may be conveniently made as castings. These, and numerous other modifications may occur without departing from the scope of our invention, and we do not wish to be understood as being limited to the precise disclosures herein, but having thus fully described preferred embodiments of our invention, as is required, what we claim as new and desire to secure by Letters Patent is:

1. In a bottle crate, upright wall members meeting to form a corner of the crate, each having an upright groove in its outer side near said corner, upright tie members in the respective grooves, a corner member lapping around said corner and outside said tie members, and fastening means extending from the corner member through the respective tie members into the respective walls.

2. In a bottle crate, upright wall members meeting to form a corner of the crate, each having an upright groove in its outer side near said corner, upright tie members in the respective grooves, an outer corner member lapping around said corner and outside said tie members, an inner corner member against the insides of said corner, and fastening means extending from the outer corner member through the respective tie members and walls to said inner corner member.

3. In a bottle crate, upright wall members meeting to form a corner of the crate, each having an upright groove in its outer side near said corner, upright tie members in the respective grooves, an outer corner member lapping around said corner and outside said tie members, an inner corner member against the insides of said corner, having a rib embossed thereon and extending in bracing relation to said wall members, and fastening means extending from the outer corner member through the respective tie members and walls to said inner corner member.

4. In a bottle crate, upright wall members meeting to form a corner of the crate, each having an upright groove in its outer side near said corner, upright tie members in the respective grooves, corner members lapping around said corner and outside said tie members, near the tops and bottoms, respectively, of said wall members, and lapping across the edges of said wall members, and fastening means extending from the corner members through the respective tie members to the respective walls.

5. In a bottle crate, upright wall members meeting to form a corner of the crate, each having an upright groove in its outer side near said corner, upright tie members in the respective grooves, corner members lapping around said corner and outside said tie members, near the tops and bottoms, respectively, of said wall members, and lapping across the edges of said wall members, and fastening means extending from the corner members through the respective tie members to the respective walls, each tie member having an opening elongated up and down where a certain one of said fastening means passes through said tie member.

6. In a bottle crate, upright wall members meeting to form a corner of the crate, each having an upright groove in its outer side near said corner, upright tie members in the respective grooves, an outer corner member lapping around said corner and outside said tie members, an inner corner member against the insides of said corner, having a stacking-guide extension above the upper edges of said walls, and fastening means extending from the outer corner member through the respective tie members and walls to said inner corner member.

7. In a bottle crate, upright wall members, one thicker than the other, meeting to form a corner of the crate, each having an upright groove in its outer side near said corner, upright tie members in the respective grooves, an outer corner member lapping around said corner and outside said tie members, an inner corner member against the insides of said corner, and fastening means extending from the outer corner member through the respective tie members and walls to said inner corner member, one of the corner members having an opening elongated toward the crate corner, with one of the fastening means extending through said opening.

8. In a bottle crate, upright wall members meeting to form a corner of the crate, each having a relatively wide shallow upright groove in its outer side near said corner, relatively thin wide upright tie members in the respective grooves, a corner member lapping around said corner and outside said tie members, and fastening means extending from the corner member through the respective tie members into the respective walls.

9. In a bottle crate, in combination with upright wall members meeting to form a corner of the crate, inner and outer corner members near the tops of said walls, inner and outer corner members near the bottoms of said walls, and upright tie members connecting an upper corner member with a lower corner member, the connection of each tie member with one of the corner members being slidable up and down.

10. In a bottle crate, in combination with upright wall members meeting to form a corner of the crate, corner members engaging the tops and bottoms, respectively, of said walls, and upright means connecting said corner members together but permitting up and down movement of said corner members relatively to each other.

11. In a bottle crate, in combination with an upright wall thereof, an upright tie member having connections to said wall near its top and near its bottom, respectively, one of the connections permitting up and down movement of the wall material relatively to the tie member incident to swelling and shrinkage of the wall material.

12. In a bottle crate, in combination with upright walls meeting to form a corner of the crate, an upright tie member having connections to one of the walls near its top and near its bottom, respectively, one of the connections permitting up and down movement of the wall material relatively to the tie member, and a stacking-guide member connected to said tie member by said connection that permits said movement but fixed to one of the walls by the last mentioned connection, to move up and down with the wall material.

13. In a bottle crate, in combination with upright walls meeting to form a corner of the crate, upright tie members having connections with the respective walls near the tops and bottoms of the walls, respectively, one of the connections of each tie member permitting up and down movement of the wall material relatively to the tie member, said tie members being embedded in the respective walls, and a corner member connecting said tie members together across said corner.

14. In a bottle crate, upright walls meeting to form a corner of the crate, corner members binding said walls together across the corner at intervals along the height of said corner, and upright means embedded in the respective walls, binding the material of said walls together in up and down direction, said corner members conecting said upright means together across said corner whereby said upright means also assists in binding the walls together.

HERBERT H. GERDING.
EDWARD A. GERDING.